(12) United States Patent
Sutehall et al.

(10) Patent No.: US 7,106,931 B2
(45) Date of Patent: Sep. 12, 2006

(54) OPTICAL FIBER DROP CABLES

(75) Inventors: Ralph Sutehall, Newport (GB); Martin Vincent Davies, Newport (GB)

(73) Assignee: Pirelli General Plc, London (GB)

( * ) Notice: Subject to any disclaimer, the term of this patent is extended or adjusted under 35 U.S.C. 154(b) by 0 days.

(21) Appl. No.: 10/495,980

(22) PCT Filed: Nov. 15, 2002

(86) PCT No.: PCT/GB02/05153

§ 371 (c)(1),
(2), (4) Date: May 19, 2004

(87) PCT Pub. No.: WO03/044584

PCT Pub. Date: May 30, 2003

(65) Prior Publication Data

US 2005/0002622 A1    Jan. 6, 2005

(30) Foreign Application Priority Data

Nov. 19, 2001   (EP) .................. 01309727

(51) Int. Cl.
G02B 6/44      (2006.01)
H01B 11/22     (2006.01)

(52) U.S. Cl. ............... 385/101; 385/102; 385/109

(58) Field of Classification Search ......... 385/100–114
See application file for complete search history.

(56) References Cited

U.S. PATENT DOCUMENTS

| | | |
|---|---|---|
| 4,575,184 A | 3/1986 | Ueno et al. |
| 4,952,021 A | 8/1990 | Aoki et al. |
| 5,189,718 A | 2/1993 | Barrett et al. |
| 5,469,523 A | 11/1995 | Blew et al. |
| 5,651,081 A * | 7/1997 | Blew et al. .................. 385/101 |
| 5,960,144 A * | 9/1999 | Klumps et al. .............. 385/113 |
| 6,236,789 B1 | 5/2001 | Fitz |
| 6,363,192 B1 * | 3/2002 | Spooner ...................... 385/101 |
| 6,545,222 B1 * | 4/2003 | Yokokawa et al. ..... 174/110 R |
| 6,563,990 B1 * | 5/2003 | Hurley et al. ............... 385/101 |

FOREIGN PATENT DOCUMENTS

| | | |
|---|---|---|
| DE | 30 37 289 A1 | 4/1982 |
| DE | 35 22 694 A1 | 1/1987 |
| EP | 0 108 590 A1 | 5/1984 |
| EP | 0 345 968 A2 | 12/1989 |
| EP | 0 410 735 A2 | 1/1991 |
| EP | 0 521 710 A1 | 1/1993 |
| EP | 0 646 818 A1 | 4/1995 |
| EP | 0 780 713 A1 | 6/1997 |
| EP | 0 969 302 A1 | 1/2000 |
| FR | 2 543 729 | 10/1984 |
| GB | 2 104 304 A | 3/1983 |
| GB | 2 180 666 A | 4/1987 |
| GB | 2 245 769 A | 1/1992 |
| GB | 2 270 992 A | 3/1994 |
| WO | WO 90/07138 | 6/1990 |
| WO | WO 03/044583 A1 | 5/2003 |

* cited by examiner

*Primary Examiner*—Akm Enayet Ullah
*Assistant Examiner*—Omar Rojas
(74) *Attorney, Agent, or Firm*—Finnegan, Henderson, Farabow, Garrett & Dunner, L.L.P.

(57) ABSTRACT

An optical fibre drop cable for suspension installation includes sheathing having a first portion containing a strengthening arrangement for supporting the cable in a suspension installation and a second portion that is separable from the first portion. The second sheathing portion contains a plurality of electrical conductors. The first sheathing portion defines at least one passage for optical fibers.

25 Claims, 4 Drawing Sheets

OPTICAL FIBER DROP CABLES

CROSS REFERENCE TO RELATED APPLICATIONS

This application is a national phase application based on PCT/GB02/05153, filed Nov. 15, 2002, the content of which is incorporated herein by reference, and claims the priority of European Patent Application. 01309727.4, filed Nov. 19, 2001.

BACKGROUND OF THE INVENTION

1. Field of the Invention

The invention relates to optical fibre drop cables for use in telecommunications systems and particularly, but not exclusively, to such cables for use in connecting between a customer's premises and a connection point common to a number of such customers.

2. Description of the Related Art

In the field of telecommunications networks, typically cables run from an exchange to a cabinet mounted at street level and from this cabinet cables are led to a customer's premises, usually by way of an aerial, or suspension installation comprising a cable suspended in catenary from poles or surrounding buildings. These aerially suspended cables leading to the customer premises are known as the final drop wire.

Historically a final drop wire has typically comprised a number of insulated conducting wires contained in a sheath. More recently the development of optical fibers has made it desirable to replace the conducting wires in drop wires with optical fibers, since the latter can transmit significantly more data. However, it is also desirable that the drop wire should carry an electrical supply in order that a telephone connected to the drop wire can be used in emergency situations when the mains electrical supply to the premises in which the telephone is located has been interrupted. For this reason, it is desirable for a drop wire to include one or more optical fibers and a pair of insulated copper conductor wires.

The applicant's application GB-A-2270992 discloses a cable containing separable electrical conductors and optical fibers. The cable comprises electrical power conductors for conveying mains voltage electrical supplies, a plurality of optical fibers and sheathing for the conductors and fibers. The sheathing is in the form of a figure of eight and defines two separate chambers; one for the electrical conductors and the other for the optical fibers. However, this cable is intended for underground routing and not for suspension installation. Furthermore, it is not suitable for conducting a relatively low voltage electrical supply for powering a telephone or otherwise as a final drop wire.

SUMMARY OF THE INVENTION

An aspect of the invention relates to an optical fibre drop cable for suspension installation, said cable comprising sheathing having a first portion containing a strengthening arrangement for supporting the cable in a said suspension installation and a second portion separable from said first portion and containing a plurality of electrical conductors, said first portion defining at least one passage for optical fibers.

BRIEF DESCRIPTION OF THE DRAWING

In order that the invention may be well understood, some embodiments thereof will now be described with reference to the drawings, in which.

DETAILED DESCRIPTION OF THE INVENTION

Figure 1:
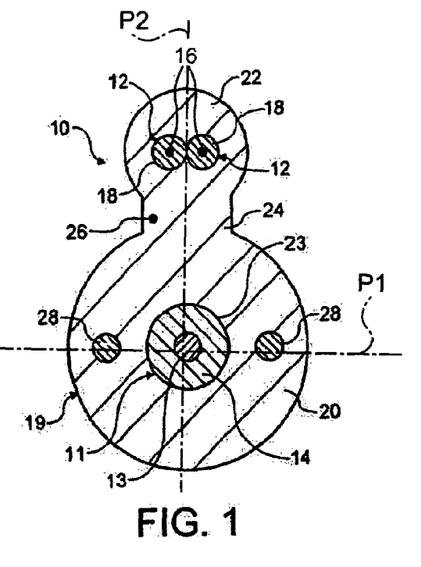
FIG. 1 is a schematic cross-section of an optical fibre drop cable comprising an optical fibre and electrical conductors.

FIG. 1 shows an optical fibre drop cable 10 containing a buffered optical fibre 11 and two insulated electrical conductors 12. The buffered optical fibre 11 comprises an optical fibre 13 and a plastics coating 14 that protects the surface of the fibre 13 from scratching and abrasion. The plastics coating may for example be a nylon coating and the fibre with coating will typically have a diameter of approximately 1 mm. The insulated conductors 12 comprise copper wires 16 encapsulated in a colour-coded electrical insulating coating 18, which may be of any suitable material as will be well known to those skilled in the art. Typically, the copper wires will have a diameter of approximately 0.4 mm and the outside diameter of the insulating coating will typically be approximately 1.2 mm One insulated conductor 12 is to serve as the live wire and the other as a neutral/earth wire in a circuit that will typically carry 9 to 12 volts for powering a telephone connected with the cable. It is to be understood that copper wires are given, only as an example and that any suitable conducting material, such as aluminium could be used instead.

The optical fibre 11 and electrical conductors 12 are housed in sheathing 19, which comprises a first portion 20 that contains the optical fibre 13 and a second portion 22 that is separable front the first portion and contains the electrical conductors 12. The optical fibre 11 is housed in a passage 23 defined by the first portion 20 with the wall defining the passage circumferentially engaging the optical fibre along the length of the fibre.

The sheathing portions 20, 22 are substantially circular in cross-section and in side-by-side parallel relationship so as to define a shape approximating to a FIG. 8. At the point of connection between the sheathing portions, there is a thickening, or web, 24. The web houses a tear, or rip, cord 26 which is offset with respect to a plane passing through the longitudinal axes of the first and second sheathing portions and runs along the cable substantially parallel to those axes. The rip cord 26 may be made of any material sufficiently strong to rip through the web 24 on application of a tear force so as to permit separation of the first and second sheathing portions. One suitable material for the rip cord is a high strength Terylene (TN) string. The sheathing 19 may be made of any suitable sheathing material such as polyethylene, MDPE, HDPE or nylon. Typically, the first portion 20 of the sheathing would have a diameter of approximately 8 mm and the combined height of the two sheathing portions would be approximately 12 mm.

A strengthening arrangement is provided in the first portion 19 of the sheathing in the form of strengthening members 28 disposed adjacent the optical fibre 11. The strengthening members 28 are disposed in parallel spaced apart relationship, one on each side of the optical fibre 11 and encapsulated in the first portion 20 of the sheathing. As shown in the drawing, the strengthening members are preferably disposed in a plane P1 extending perpendicular to a plane P2 passing through the respective longitudinal axes of the sheathing portions 20, 22 and through the longitudinal axis of the first portion 20 of the sheathing. The strengthening members 28 have a substantially circular cross-section and extend generally parallel to the longitudinal axis the first portion 20 of the sheathing.

Preferably, the strengthening members are made of a dielectric material such as glass reinforced plastic (GRP), although glass yarns may be used with similar advantage. Other non-preferred materials include aramid fibers. Although dielectric materials are preferred, metallic strengthening elements may be used. GRP strengthening materials are a preferred material since the material has a similar coefficient of thermal expansion to optical fibers and thus changes in length of the strengthening members due to thermal effects, should not result in an increase in the forces transmitted to the optical fibre. Glass yarns offer a similar advantage. Materials such as aramid fibers and metallic elements have a different coefficient of thermal expansion to optical fibers and if these are used, account should be taken of the fact that they will expand or contract differently to the optical fibers and measures taken to ensure that this does not result in an adverse loading on the optical fibre 13.

Further advantages are gained by having strengthening members made of an electrically non-conducting material such as GRP, glass yarn or aramid fibers. If the strengthening members are made of an electrically conducting material such as a stranded steel, it is necessary to increase the diameter of the sheathing for electrical insulation purposes. When electrically non-conducting strengthening members are used, there is no requirement to maintain an increased thickness of sheathing in the first portion 20 of the sheathing in order to meet any voltage withstand requirement. Thus, the diameter of the first portion of the sheathing can be reduced, which reduces the effect of ice and wind loads on the cable. It is believed that by using electrically non-conducting strengthening members, the diameter of the first portion 19 of the sheathing can be reduced by up to 2 mm as compared with the case when the sheathing is required to provide electrical insulation.

Figure 2:
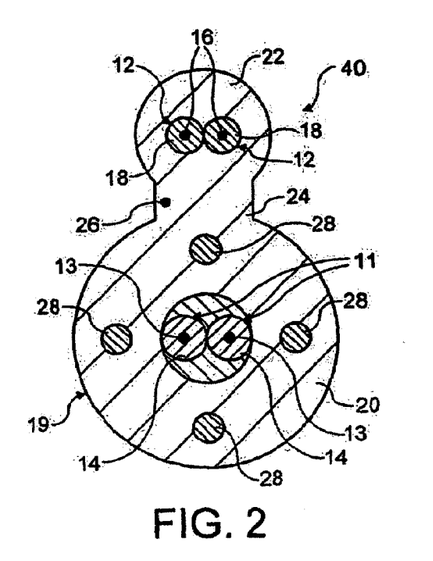
FIG. 2 is a schematic cross-section of an optical fibre drop cable containing a plurality of optical fibers and electrical conductors.

The optical fibre drop cable 40 shown in FIG. 2 shows modifications which may be made to the optical drop fibre 10 singly or in combination. The first modification comprises the addition of two further strengthening members 28. The four strengthening members 28 of the optical fibre cable 40 are disposed on a common pitch circle and are spaced at 90° intervals on that circle, such that a plane passing through the longitudinal axes of the first and second portions 20, 22 of the sheathing passes through the longitudinal axis of two of the strengthening members and a second plane perpendicular to that plane passes through the longitudinal axes of the other two strengthening members. The second modification comprises the provision of two optical fibers 11. As shown in the drawing, the optical fibers 11 are loosely housed in a circular passage 44. However, the first portion 20 of the sheathing may be formed so as to define a single passage or separate passages encasing the optical fibers in the same way as in the optical fibre cable 10 in FIG. 1.

Figure 3:
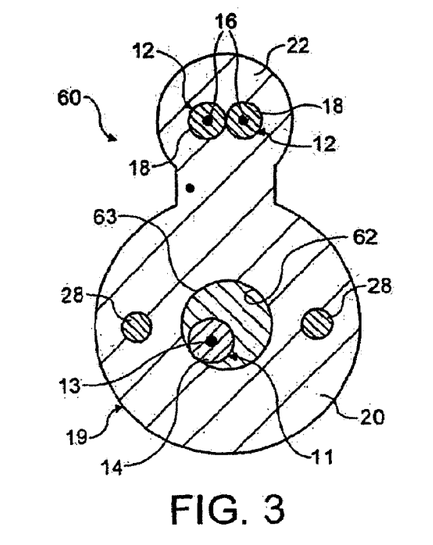
FIG. 3 is a schematic cross-section of an optical fibre drop cable comprising an optical fibre and electrical conductors.

FIG. 3 shows an optical fibre drop cable 60 that differs from the optical fibre drop cable 10 in that the optical fibre 11 is loosely housed in a hollow plastic tube 62 contained in a passage 63 defined by the first sheathing portion 20. This tube may contain more than one optical fibre although only one is shown in the drawing.

A possible modification (not shown) to the optical fibre cable drop 60 shown in FIG. 3 comprises omitting the optical fibre(s) 11 from the tube 62. In this case, one or more fibers 11 are blown into the tube after installation of the optical fibre drop cable. Optical fibers to be installed by blown fibre methods may, for example, take the form disclosed in EP-A-0345968, EP-A-0521710 or EP-A-0646818 and may be introduced into the tube 62 by known blowing processes such as the process described in EP-A-0108590. For blown fibre installation the tube 62 may be made of polyethylene with a carbon loaded radially inner surface to increase conductivity, as disclosed in U.S. Pat. No. 4,952,021. Blown fibre installation has the advantage that optical fibre(s) are not subjected to stresses that arise during suspension of the cable.

Another possible modification (not shown) to the optical fibre drop cables 10, 40, 60 comprises replacing the strengthening members 28 with a strengthening arrangement in the form of a reinforcing sleeve contained in the first portion 20 of the sheathing. The sleeve would preferably be made of an electrically non-conducting material such as aramid fibers. However, the sleeve could be made of strands of a metallic element such as steel. The fibers or strands of such a sleeve would preferably be helically wound around the optical fibre(s) 11 and/or tube(s) 62 and electrical conductors 12 from two directions—a so-called SZ winding.

Figure 4:
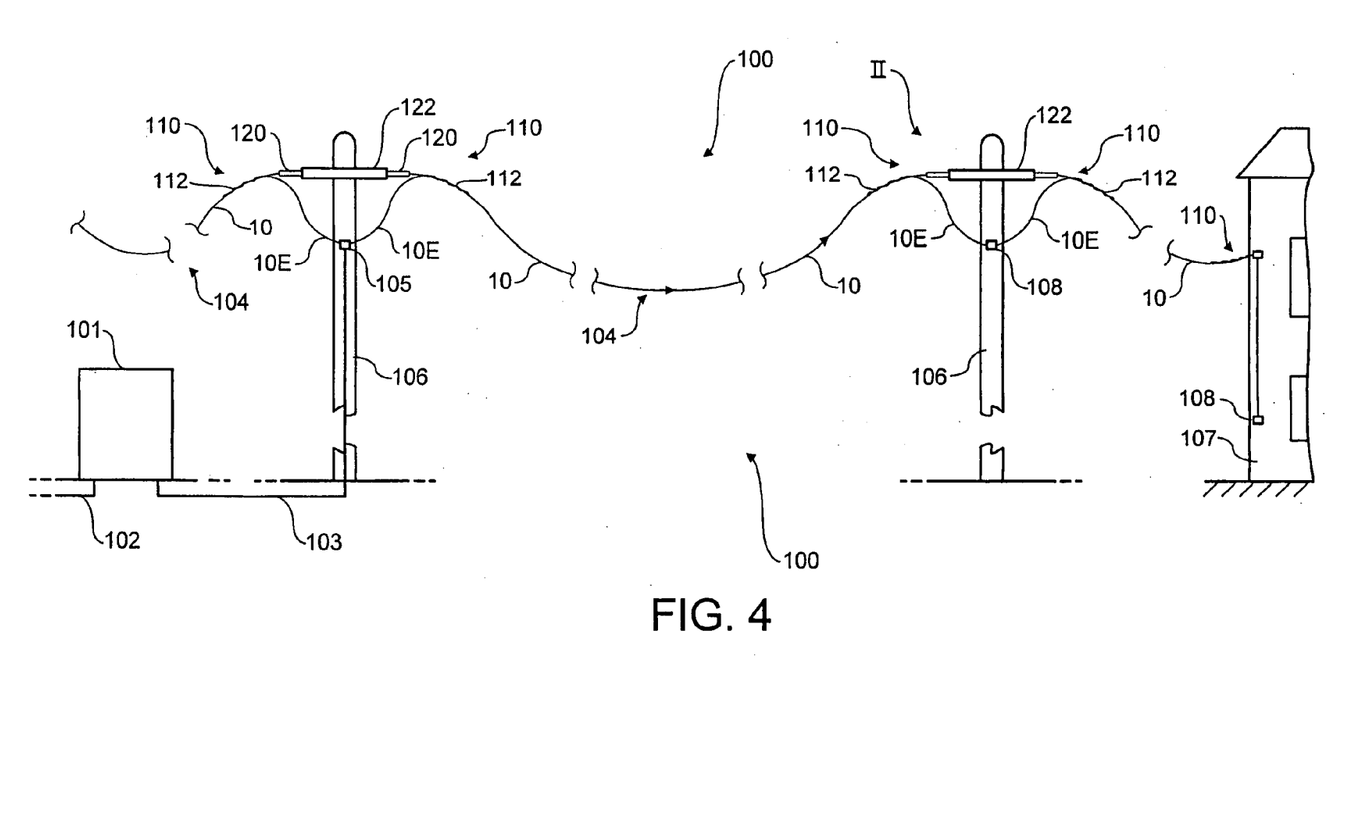
FIG. 4 is a schematic representation of a drop cable installation including a cable as shown in FIG. 1, 2 or 3.

FIG. 4 shows a drop installation 100 comprising any of the optical fibre drop cables 10, 40 and 60. For ease of description reference will now be made only to the installation comprising the optical fibre drop cable 10.

The drop installation 100 includes a housing 101 containing a distribution arrangement for distributing connections to telecommunications lines that are to run to customer premises. The housing is fed from an exchange by means of a multifibre optical fibre cable 102 such as a known 48 fibre underground cable. A multifibre optical fibre cable 103 comprising sufficient fibers for connecting with ten telecommunications lines 104 (ten fibers for single fibre circuits or twenty fibers for twin fibre circuits), leads from the housing 101 to a connecting box, or manifold 105 of an adjacent pole 106. In addition, the reference numeral 103 indicates electrical conductors for conducting a voltage of 9 to 12 volts to the manifold.

A telecommunications line 104 runs from the manifold 105 to customer premises such as a building 107. In the drawing, two telecommunications lines 104 are shown; one extending to the right of the manifold and leading to the building 107 and the other extending to the left of the manifold. As mentioned above, the optical fibre cable 103 contains sufficient optical fibers to connect with ten telecommunications lines 104 and thus there may be ten separate telecommunications lines extending from the manifold 105.

The telecommunications lines 104 each comprise a plurality of lengths of the optical fibre drop cable 10 connected end-to-end at respective connecting boxes 108 mounted on poles 106 and the building 107. The lengths of cable 10 are connected to the poles 106 by securing devices 110. In the drawing, only two poles are shown, but in practice there will be as many poles as are required to support the cable en route between the manifold 105 and the customer premises. Typically the spacing between the poles is approximately 200 feet (61 meters), although it may be up to 100 meters.

Figure 5:
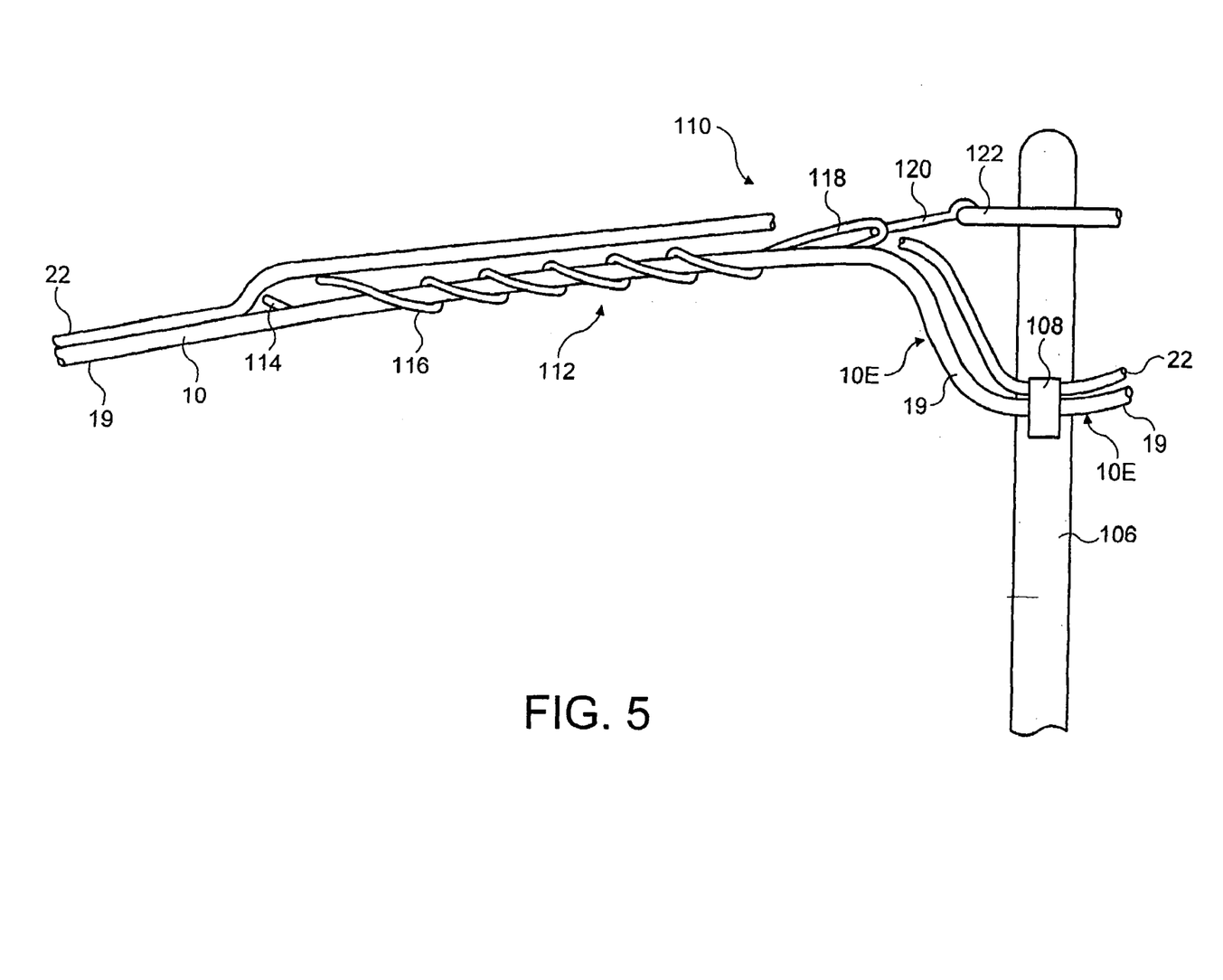
FIG. 5 is an enlargement of the portion of FIG. 4.

As best seen in FIG. 5, each securing device 110 comprises an elongate member 112 which is bent double to define two end portions 114, 116 that are helically wrapped around the first portion 20 of the sheathing in the same sense, and a bend, or loop, 118 that connects the end portions. The securing device 110 additionally comprises a tensile connecting member 120 having hooked end portions, one of which engages the loop 118 and the other of which engages a pole ring 122 fixed to the pole 106. The tensile connecting member 120 may include means (not shown) for adjusting the tension in the cable 10 between the securing devices on adjacent poles 106. In this case, the tensile connecting member may comprise two portions each having threading at their ends remote from the hooked end portions and interconnected by a nut such that rotation of the nut causes lengthening or shortening of the tensile connecting member.

As shown in FIG. 5, in order to allow the end portions 114, 116 of the elongate member 112 to wrap around the first portion 20 of the sheathing, the second portion 22 containing the electrical conductors 12 is separated from the first portion 19. This separation is easily obtained by accessing the free end of the rip cord 26 at the adjacent end of the optical fibre cable 10 and using this to rip through the web 24 over a suitable distance. In the drawing a break is shown in the separated portion of the first portion 19 of the sheathing simply to allow a better view of the loop 118 and the tensile connecting member 120.

Figure 6:
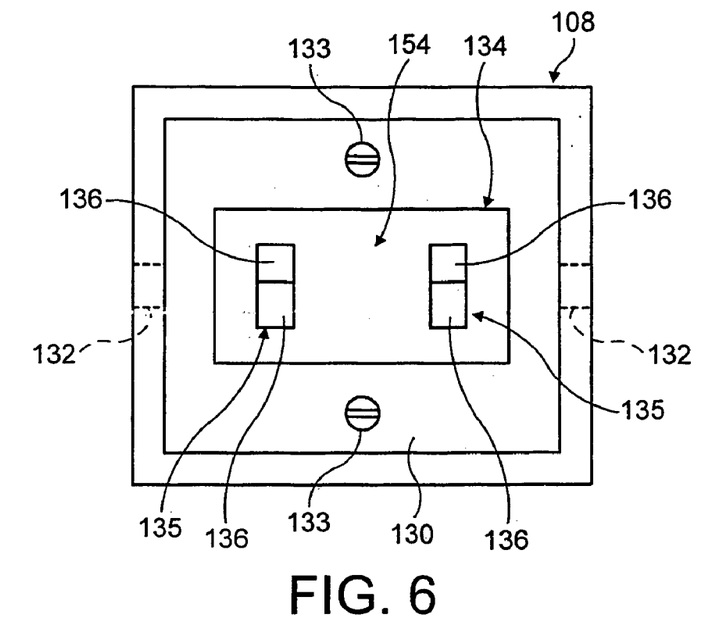
FIG. 6 is a schematic representation of a connecting box of the installation of FIG. 4.

As shown schematically in FIG. 6, a connecting box 108 has a hollow interior 130, that can be accessed by removing a cover plate (not shown). An opening 132 for a cable 10 is provided at each side of the box to serve as an entry point for an end of a cable 10. As an alternative to single openings 132, pairs of openings may be provided for individually receiving the separated sheathing portions. The connecting boxes 108 are secured to the poles 106 by any suitable means, such as screws 133. Each box contains a push-fit connector arrangement, or device, 134 by means of which the ends of the cables 10 are secured within the box. The push-fit connector arrangement 134 may utilise any suitable known push-fit technology and has two push-fit connection points 135 at spaced apart positions, one for each cable end.

Figure 7:
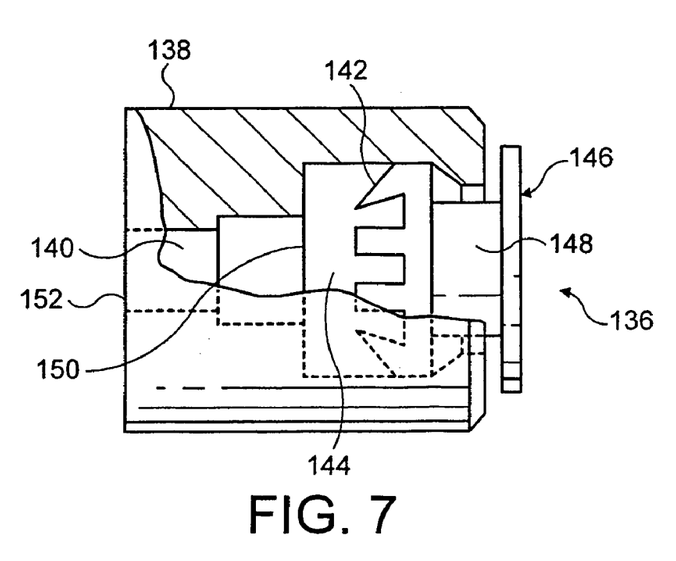
FIG. 7 shows a push-fit connector arrangement included in the connecting box.

The push-fit connection points 135 may each include two push-fit connectors such as the push-fit connector 136 as shown in FIG. 7. Each push-fit connector 136 comprises a body 138 that defines a stepped through-passage 140. A gripping means 142 that comprises a ring having a plurality of circumferentially spaced apart radially and axially inwardly extending projections, or barbs is housed in a larger diameter portion 144 of the through-passage 140 at a position remote from the ends of the through-passage. The gripping means 142 is preferably made of metal, but may be made of a plastics material, and the barbs are able to deflect radially outwardly on insertion of an end of a sheathing portion 20, 22 into the through-passage 140 (from the right as viewed in the drawing), but dig into the sheathing if the cable is pulled in the direction opposite to the direction of insertion so as to resist subsequent withdrawal of the sheathing portion from the connection point 135. A collet 146 may be provided to permit withdrawal of the sheathing portion should it become desirable to break the connection. The collet 146 has a cylindrical leading-end portion 148 which projects into the through-passage 140 and is engageable with the barbs on axial inward movement relative to the gripping means 142 to deflect the barbs radially outwardly to release the grip on the sheathing portion and permit its withdrawal.

To form a connection between adjacent ends of the lengths of cables 10 in a connecting box 108, the separated first and second sheathing portions 20, 22 of the respective ends of the cables are fed through the openings 132 into the hollow interior of the connecting box 108. The sheathing and strengthening members 28 are cut back to expose the optical fibre 11 and insulated conductors 12 and then the ends of the sheathing portions are push-fitted into the respective push-fit connectors 136 until the cut end of the sheathing abuts a shoulder 150 defined by the through-passage 140. At this stage, the ends of the first and second portions of the sheathing are secured in the push-fit connectors 136 by the barbs of the gripping means 142 and the exposed optical fibre 11 and insulated conductors 12 protrude from the inner ends 152 of the through-passages to a connection region 154 of the connecting box. Here the electrical conductors and optical fibers of the cable ends are connected by any suitable conventional means. For example, the conductors 12 may be connected by stripping back the insulating coating 18 to expose the copper wires 16 and twisting the ends of the wires together. Alternatively, a terminal block in which the ends of the conducting wires are secured by means of screws may be used.

The manifold 105 may be of similar construction to a connecting box 108. The manifold 105 would contain an additional opening through which the optical fibre cable 103 is fed and ten openings 132 to permit ten telecommunications lines 104 to feed from the manifold. The ends of the telecommunications lines 104 can be secured in the manifold 105 by means of push-fit connectors, such as the push-fit connectors 136 in the same way as in the connecting boxes 108, or by any other suitable means. Similarly, connections between the electrical conductors feeding into the manifold and the optical fibers of the optical fibre 103 may be made with the electrical conductors 12 and optical fibers 11 by any suitable conventional means. As shown in FIG. 4, the lengths of optical fibre drop cable 10 suspended between the poles 106 are connected to the poles by the securing devices 110, which are secured to the cable at spaced apart positions remote from its ends. The tension in the cable suspended between the poles can be adjusted after suspension of the cable by means of the adjusting means of the tensile connecting members 120 if such means are provided. The end portions 10E (FIG. 5) of the first portion of the sheathing and its contents between the securing devices 110 and the connecting boxes 108 are untensioned.

The helical winding of the ends 114, 116 of the elongate member 112 can be adapted such that it will grip the sheathing with a predetermined force so that the sheathing will slip when the tension in the cable 10 reaches or exceeds a predetermined level. Once the cable slips, the previously untensioned portions 10E will be tensioned and the connection points 136 are arranged such that the cable will be released, breaking the connection with the adjacent lengths of cable when the tension in the portion 10E reaches a second predetermined level which is no greater than the tension load that causes the slippage of the cable and is preferably substantially less. The tension load at which the elongate member 112 permits slippage of the cable is selected such that the cable will slip at a loading less than that required to break the cable. It is expected that the strength of the cable would be such that it would break under a load in the region of 2 KN, that the elongate member 112 would be arranged to permit slippage of the cable under a load in the region of 1.2 to 1.5 KN and the push-fit connectors would be arranged to permit the cable connections to break at a load in the region of 170 N, although it is to be understood that these loads are given as examples and should not be taken as limiting.

In the drop installation 100, the ends 10E are described as being secured to the connecting box 106 by means of a push-fit arrangement. It will be appreciated that this arrangement whilst advantageous in terms of simplicity and ease of fitting, should not be taken as limiting. The ends 10E may be secured by any suitable means, such as a spring-loaded cable clamp that will provide sufficient security to hold the ends 10E in place and avoid any tensile load being transmitted to the joints between the optical fibers 11 and conductors 12 during normal operating conditions and at the same time reliably permit breakage of the connection at a tensile loading no greater than that required to cause slippage of the cable through the securing devices 110.

If the telecommunications line 104 is to be constructed using an optical fibre drop cable 60 as shown in FIG. 3, with the optical fibre(s) being installed by blown fibre technique, it is necessary to provide a substantially gas-tight passage along which the optical fibers are to be blown. In this case, the first portion 20 of the sheathing is cut back such that when its end is push-fitted into a push-fit connector 136, the cut end of the plastics tube 62 protrudes from the end 152 of the through-passage 140 into the connection region 154. The ends of the tubes 62 protruding into the connection region can then be interconnected to provide a gas-tight passage for the optical fibre(s) by means of a suitable length of tubing inserted therebetween. Alternatively, means defining a passage could be provided between the push-fit connection points 135 and arranged such that the ends of the tubes 62 can be inserted therein to provide a continuous air-tight passage for the optical fibre(s).

It is to be understood that whilst the optical fibre drop cables are described as being used in the drop installation 100, which provides for a controlled breakage of the telecommunications line, this is not essential and the cables could be used in any suitable conventional drop installation.

Whilst it is not essential that the optical fibre drop cables 10, 40, 60 are installed in an arrangement such as the arrangement 100 that provides controlled breakage of the telecommunications line under a load less than that required to break the cable, it will be appreciated that such an arrangement is advantageous. This is because the loading which will cause the optical fibre drop cable to slip and the connection between adjacent ends to break can be chosen to be less than that required to break the cable, which is a useful safety feature in the event of a high vehicle driving into the telecommunications line 104 or a tree or other structure falling on it. Furthermore, since the connections between a length of the optical fibre drop cable and adjacent lengths in the line are broken in the event of such events, damage to the telecommunications line should be localised thereby reducing the time required for and cost of repair. In addition, since the telecommunications line can be designed to break on application of a predetermined loading, the cable can be made significantly stronger than might otherwise be the case, thereby providing greater protection for the optical fibre(s) contained in the cable. In particular, the cable can be made stiffer and thus able to better withstand the effects of variable loading due to wind force and the settling of moisture or ice formation.

It will be understood that generally there are advantages of having the strengthening arrangement provided in the first portion of the sheathing adjacent the optical fibers as opposed to the possibility of supporting the cable by way of an existing aerial installation, or providing a strengthening arrangement auxiliary to the cable or in the second portion of the sheathing. These are that the strengthening arrangement can directly control the thermal and tensile performance of the cable and provide better protection for the optical fibre(s) by virtue of its close proximity to it/them. It also provides the advantage that if the sheathing portions are to be separated for installation in an arrangement such as that shown in FIGS. 4 and 5, no special measures need be taken to protect the optical fibre(s) in the region in which the sheathing portions are separated.

The optical fibre drop cables of the embodiments are low fibre count cables intended to be used in aerial installations as a final drop wire. It is envisaged that such a low fibre count cable may comprise only one or two optical fibers. Furthermore, the electrical conductors are intended to carry only a low voltage, preferably in the region of 9 to 12 volts, and only two conductors are needed for this purpose.

The invention claimed is:

1. An optical fibre drop cable for suspension installation, said cable comprising:
    a sheathing; and
    a strengthening arrangement, said sheathing having a first portion extending in a lengthwise direction along a first longitudinal axis and said first portion of the sheathing containing the strengthening arrangement for supporting the cable in said suspension installation, and said sheathing having a second portion extending along a second longitudinal axis and being separable from said first portion and containing a plurality of electrical conductors, said first portion defining at least one passage for optical fibers,
    wherein said strengthening arrangement includes first and second strengthening members provided in an opposed spaced apart relationship, said first and second strengthening members extending in the lengthwise direction of the first portion of said sheathing, said passage being provided between said first and second strengthening members, and
    wherein a first plane passes through the first longitudinal axis and a second plane passes through the first and second longitudinal axes, the first plane being perpendicular to the second plane, and at least one strengthening member is disposed in the first plane.

2. A cable as claimed in claim 1, having at least one said passage containing at least one optical fibre having a length and circumferentially engaged along said length by a wall defining said passage.

3. A cable as claimed in claim 1, having at least one said passage having at least one optical fibre loosely housed therein.

4. A cable as claimed in claim 1, having at least one passage containing a tubular member for receiving at least one optical fibre.

5. A cable as claimed in claim 1, wherein said strengthening arrangement is made of a dielectric material.

6. A cable as claimed in claim 5, wherein said strengthening members comprise a glass reinforced plastics material.

7. A cable as claimed in claim 1, wherein at least two of the strengthening members are disposed in said first plane.

8. A cable as claimed in claim 1, further comprising a separation arrangement for facilitating selective separation of said first and second portions of the sheathing.

9. A cable as claimed in claim 8, wherein said separation arrangement comprises a tearing element contained in said sheathing between said first portion and said second portion for tearing through said sheathing to facilitate selective separation of said first and second portions of the sheathing.

10. A cable as claimed in claim 8, wherein said first portion has a longitudinal axis, said second portion has a longitudinal axis, and said tearing element is offset with respect to a plane passing through said axes.

11. A cable as claimed in claim 9, wherein said sheathing defines a third portion connecting said first portion and said second portion and wherein a rip cord is housed in said third portion.

12. A cable as claimed in claim 1, wherein said first and second portions of the sheathing each have a generally circular cross-section and said portions are arranged such that said sheathing has a cross-section that is substantially in the shape of a figure eight.

13. A cable as claimed in claim 1, comprising a housing for optical fibers.

14. A cable as claimed in claim 13, wherein said housing contains at least one optical fibre.

15. A drop installation including a telecommunications line comprising an optical fibre drop cable as claimed in claim 1, suspended from a plurality of spaced apart aerial locations.

16. An installation as claimed in claim 15, wherein said telecommunications line comprises a plurality of lengths of said optical fibre cable connected in end-to-end relationship at said aerial locations by respective connection devices, said telecommunications line being secured to each said aerial location by respective securing devices secured to the line at two spaced apart positions such that the portion of the line between said positions is untensioned and includes a said connection device, said securing devices being arranged to permit transmission of a tensile load to a said untensioned portion of the line when a tensile load on the line adjacent thereof on either side of the aerial location reaches a first predetermined level and said connection devices being arranged to cause the end-to-end connection of the lengths of optical fibre cable connected thereby to break when the tensile load transmitted said untensioned portion reaches a second predetermined amount that is less than a tensile load required to break the optical fibre cable and no greater than said first predetermined level.

17. An installation as claimed in claim 16, wherein each securing device is arranged to frictionally grip said sheathing and to allow said line to slip relative thereto to transmit said tensile load.

18. An installation as claimed in claim 16, wherein said first and second portions of the lengths of cable are separated from one another at respective regions of the lengths of cable at which the securing devices engage the telecommunications line.

19. An installation as claimed in claim 18, wherein the securing devices comprise two end portions of a bent-double elongate member, which end portions are helically wrapped around the first portion of the sheathing at a respective region of separation at which said first and second portions of the sheathing have been separated.

20. An installation as claimed in claim 18, wherein the regions of separation of the first and second portions of the sheathing extend to the respective connection device, wherein the first and second portions are separately connected with the connection device.

21. An installation as claimed in claim 20, wherein said connection devices comprise respective push-fit connectors for the first and second portions of the sheathing.

22. A drop installation including a telecommunications line comprising an optical fibre drop cable as claimed in claim 10, wherein: said telecommunications line comprises a plurality of lengths of said optical fibre cable connected in end-to-end relationship at said aerial locations by respective connection devices, said telecommunications line being secured to each said aerial location by respective securing devices secured to the line at two spaced apart positions such that the portion of the line between said positions is untensioned and includes a said connection device, said securing devices being arranged to permit transmission of a tensile load to a said untensioned portion of the line when a tensile load on the line adjacent thereof on either side of the aerial location reaches a first predetermined level and said connection devices being arranged to cause the end-to-end connection of the lengths of optical fibre cable connected thereby to break when the tensile load transmitted said untensioned portion reaches a second predetermined amount that is less than a tensile load required to break the optical fibre cable and no greater than said first predetermined level; and at each said end-to-end connection, a part defining a connecting passage is arranged such that said connecting passage extends between the ends of the respective housings of the lengths of cable to define a substantially gas-tight passage for optical fibers.

23. An installation as claimed in claim 22, wherein said parts are a part of the respective connecting devices.

24. An optical fibre final drop cable for suspension installation, said cable comprising not more than two optical fibers, two electrically conducting wires, a first portion extending in a lengthwise direction along a first longitudinal axis, and a second portion extending along a second longitudinal axis and being separable from said first portion and containing a plurality of electrical conductors, said first portion comprising wall defining at least one passage for optical fibers, said passage containing at least one optical fibre, wherein a strengthening arrangement for supporting the cable in said suspension installation is embedded in said wall, wherein said strengthening arrangement includes first and second strengthening members provided in an opposed spaced apart relationship, said first and second strengthening members extending in the lengthwise direction of the first portion, said passage being provided between said first and second strengthening members, and wherein a first plane passes through the first longitudinal axis and a second plane passes through the first and second longitudinal axes, the first plane being perpendicular to the second plane, and at least one strengthening member is disposed in the first plane.

25. A method of producing an optical fibre drop cable, said method comprising advancing two electrically conducting wires along a first path of travel, advancing at least one strengthening element along a second path of travel and extruding a sheath around said two electrically conducting wires and said at least one strengthening element, said extruding step being such that said sheath comprises a first sheathing portion extending in a lengthwise direction along a first longitudinal axis, and a second sheathing portion extending along a second longitudinal axis and being separable from said first sheathing portion and containing a plurality of electrical conductors, said first sheathing portion comprising a wall defining at least one passage for optical fibers, said passage containing at least one optical fibre, wherein a strengthening arrangement for supporting the cable in said suspension installation is embedded in said wall, wherein said strengthening arrangement includes first and second strengthening members provided in an opposed spaced apart relationship, said first and second strengthening members extending in the lengthwise direction of the first sheathing portion, said passage being provided between said first and second strengthening members, and wherein a first plane passes through the first longitudinal axis and a second plane passes through the first and second longitudinal axes, the first plane being perpendicular to the second plane, and at least one strengthening member is disposed in the first plane.

* * * * *